United States Patent [19]

Victor

[11] Patent Number: 5,185,389

[45] Date of Patent: * Feb. 9, 1993

[54] LATEX MODIFIED MORTAR AND CONCRETE

[75] Inventor: Riley Victor, Toronto, Canada

[73] Assignee: GemEng, Ltd., Ontario, Canada

[*] Notice: The portion of the term of this patent subsequent to Dec. 24, 2008 has been disclaimed.

[21] Appl. No.: 726,122

[22] Filed: Jul. 1, 1991

Related U.S. Application Data

[63] Continuation of Ser. No. 511,835, Apr. 20, 1990, abandoned, which is a continuation of Ser. No. 179,570, Apr. 8, 1988, abandoned, which is a continuation-in-part of Ser. No. 900,396, Aug. 26, 1986, abandoned.

[51] Int. Cl.$^5$ .................................................. C08K 3/00
[52] U.S. Cl. .......................................... 524/2; 524/4; 524/5; 524/6; 524/7; 524/8; 106/689; 106/778; 106/802
[58] Field of Search ..................... 524/2, 4, 5, 6, 7, 8; 106/689, 778, 802

[56] References Cited

FOREIGN PATENT DOCUMENTS 1143385 3/1983 Canada ..................................... 524/2
1498297 1/1978 United Kingdom ................... 106/94

Primary Examiner—Joseph L. Schofer
Assistant Examiner—Peter D. Mulcahy
Attorney, Agent, or Firm—Rhodes, Coats & Bennett

[57] ABSTRACT

A modified mortar or concrete composition in which a polymeric binding material is combined with sand, cement, and fine fillers. Use of the higher than previously considered functional ratio of latex binding material to cement permits the resulting mortar or concrete composition to increase the percentage of fine fillers, and reduces the amount of voids as a result of less water loss. The latex material partially fills the voids becoming a part of the structure of the system. This leads to a higher degree of flexibility and coherence of the system.

3 Claims, No Drawings

LATEX MODIFIED MORTAR AND CONCRETE

This application is a continuation of application Ser. No. 07/511,835, filed Apr. 20, 1990, now abandoned, which is a continuation of application Ser. No. 07/179,570 filed Apr. 8, 1988, now abandoned, which is a continuation-in-part of application Ser. No. 06/900 396, filed Aug. 26, 1986, now also abandoned.

This invention relates to an improved mortar or concrete, and more particularly to an improved latex modified mortar in which an elastomeric or thermoplastic latex provides the primary binding material.

In conventional mortars and concretes, cement (generally Portland cement) serves as the primary binding agent. The Portland cement mixed with water causes the sand, gravel, crushed rock, or other aggregate to adhere together and harden when subjected to air. Cement, sand, and water form mortar which is used between building components such as brick, block, and tile causing such structural building components to adhere together when the mortar dries. Concrete, on the other hand, combines gravel or other aggregate with the mortar to form a structural solid material.

In the present application the following definitions are applicable:

"Latex" means dispersions of either elastomeric or amphorous thermoplastic polymer particles in water. The main elastomeric latexes are: natural rubber, styrene butadiene, polyacrylonitrile butadiene and polychloroprene. The primary thermoplastic latexes are: polyvinyl acetate, polystyrene, polyvinylchloride, polyacrylates, or their copolymers.

"Cements" are inorganic materials which set and harden when mixed with water and cause other components to bind together. Cements include: compounds of calcium, aluminum, silicon, oxygen and/or sulphur including cements commonly referred to as "Portland" cements, aluminous, high alumina, and calcium aluminate cements, and variations of the foregoing with or without minor additives such as accelerators and retardants.

"Fine Fillers" are fine particles typically with particle sizes in the range of 1.0 micrometers to substantially mm in diameter and including the following materials: silica or alumina materials such as fine or ground sand, ground silica, colloidal or precipitated silica and corindon; carbonates such as natural or surface treated magnesium or calcium carbonate, or a calcium, barium or magnesium carbonate such as dolomite; sulphates such as calcium sulphate, for example, hydrated plaster and gypsum, insulation materials such as expanded glass or clays, vermiculite, perlite and celite; and expanded plastics such as polystyrene and polyurethane; metal filings; short milled fibres and mica.

"Sand" and/or "aggregates" generally means particles in the range of substantially 0.10 mm to 6.0 mm and include the following materials: common or silica sand, light weight aggregates such as perlite, vermiculite, fly ash, pumice, expanded clay, expanded polystyrene beads, and carbon beads. According to the present invention some mortars useful as wood or metal fixes or patches may eliminate the sand from the mixture.

"Mortar" generally means mixtures of cement (or latex), sand, and water with or without minor additives such as air-entraining agents which set and harden after being mixed together. However, again for some uses the sand may be eliminated.

"Concrete" is a material made by mixing mortar in its fresh, unhydrated state with coarse aggregates such as crushed stone having a typical particle size in the range of 6.0 mm to 50 mm.

Previously, it has been known that the properties of mortar and concrete can be improved by reducing the amount of water added to the mixture prior to setting and hardening. A certain minimum amount of water is needed in order to obtain the required workability or fluidity, and so water content can only be reduced if special techniques are used such as: adding plasticizers to the fresh mix; selecting a proper grading of aggregates used in the mix; selecting a cement which requires less water for the same workability (for example high alumina cements require less water than Portland cement); using vibration to place the mix which means less workability is needed; removing water after the fresh mix is in place (for example by spinning or subjecting the fresh mix to a vacuum); and adding latexes.

Latexes allow reduction of the amount of water used since they have a plasticizing effect on the mix. Latexes also form a three-dimensional film throughout the mortar or concrete on drying and this provides additional beneficial effects such as higher strength, greater wear resistance, greater durability, greater flexibility, and improved resistance to chemical attack. Latex modified mortars and concretes also have a much higher bonding strength compared with other materials compared to unmodified, or cement based mortars and concretes.

Conventionally, latexes are added to mortar or concrete by adding a small amount of latex to the fresh mix and reducing the amount of water to the extent that the same workability is obtained. Generally, in accordance with prior procedures a conventional mortar or concrete is made with a water/cement ratio by weight of approximately 0.40 to 0.50. Conversely a conventional latex modified mortar or concrete is generally made with equivalent workability at a water/cement ratio by weight of 0.30 to 0.40 due to the plasticizing effect of the latex. Note that latexes contain water, usually approximately 50% by weight, and this water must be considered as part of the mixing water.

It is known that fine fillers require more water in the mix, causing detrimental effects on conventional or unmodified mortars and concrete such as lower wear resistance, lower hardness, and lower strength and durability. As a result, various regulatory specifications for concrete and mortar limit the amount of fine fillers which can be used in concrete to not more than 3%-5%, the actual amount in this range depending on the application. This practice of not using fine fillers in unmodified mortars and concrete has been carried over into latex modified mortars and concrete which first began to be commercialized widely in the 1950s.

In the present invention, the amount of polymeric binding material is substantially increased. As a result a substantial portion of the cement (up to 90%) can be replaced with fine fillers which can provide beneficial results for certain industrial applications. Such improved properties include higher flexibility, higher impact resistance, greater resistance to chemical attack, and improved binding with other materials.

As a result, the improved modified mortar or concrete system of the present invention comprises a polymeric or latex binding material as the primary binder along with fine fillers and relatively small amounts of cement. The preferred polymeric binding materials are either elastomeric or thermoplastic latexes and comprise at least 40% of the combined total weight of fine fillers and cement. Further the amount of fine fillers is increased to the point that the fine fillers comprise 25%–90% of the combined total weight of fine fillers and cement. In such systems, the cement is minimized and acts only as a drying agent and an alkalinity inducing agent, rather than a binding agent.

Further, the mortar may be used as a patching composition for both wood and metal articles. For example the composition may be used to patch rotted wood; to seal cracks in floors and sidings; patch wood foundations; repair and restore rusted gutters and yard equipment; and refinish steel posts and railings. In such cases the sand or aggregate is eliminated from the composition.

DETAILED DESCRIPTION OF A PREFERRED EMBODIMENTS

In accordance with the present invention the elastomeric latexes are natural rubber, styrene butadiene, polyacrylonitrile butadiene, and polychloroprene. The preferred thermoplastic latexes are polyvinyl acetate, polystyrene, polyvinylchloride, polyacrylates, or their copolymers.

A typical conventional latex modified mortar, which is representative of those known and used previously would include the ingredients set forth in the Table A below in the indicated parts by weight ratios:

TABLE A

| Ingredients | Parts by Weight |
| --- | --- |
| Sand | 300 |
| Portland Cement | 100 |
| Dow 460 Latex (50% water) | 20–40 |
| Antifoam B | 0.5 |
| Water | 34–12 |

In the Table A above Dow 460 Latex is a styrene butadiene latex and is available from Dow Chemical Company of Midland, Michigan. Antifoam B is an antifoam agent available from Dow Corning Corporation. The weight of the latex comprises less than 33% of the combined total weight of the cement and water.

In the following Table B, column A represents a preferred improved latex modified mortar and column B represents an alternative improved latex modified mortar; and column C represents a patching composition for such items as wood or metal articles.

TABLE B

| Ingredients | Parts by Weight A | B | C |
| --- | --- | --- | --- |
| Sand | 300 | 300 | — |
| Portland Cement | 25 | 25 | 25 |
| Veroc #1 Filler | — | 75 | 75 |
| Duramite | 75 | — | — |
| E330 Latex | 62.5 | — | — |
| Dow 460 Latex | — | 62.5 | 62.5 |
| Antifoam B | 0.5 | 0.5 | 0.5 |
| Water | — | — | — |
| Surfactant (Surfanol 104H) | 0.03 | 0.03 | 0.03 |

Duramite is a calcium carbonate filler available from White Pigment Corporation of Florence, Vermont. Veroc #1 is a calcium limestone filler, also produced by White Pigment Corporation of Florence, Vermont. E-330 Latex is an acrylic latex available from Rohm and Haas Chemical Company of Philadelphia, Pennsylvania. Surfanol 104H is a surfactant available from Air Product and Chemical, Inc. of Allentown, Pennsylvania.

In the preferred embodiment of the improved latex modified mortar compositions shown in Table B, 75% of the Portland cement (by weight) has been replaced by fine filler. This is made possible by the increased amount of latex, which now comprises approximately 62.5% by weight of the combined total of cement and filler. The mixes of Table B have about the same workability as the composition of Table A, however, the improved mixes of Table B have a lower water content and a lower cost since the fine fillers are much less expensive than cement. In addition, the compositions of Table B will exhibit superior properties such as greater flexibility, higher impact resistance, less shrinkage, greater resistance to chemical attack, and greater bond with other materials. Further, the compositions of Table B have great versatility since, if sand is left out, the mix can be used as a paint or coating for concrete, masonry, wood, etc. The fine fillers prevent "mudcracking" in the paint. If the sand is left out and the proportion of fine filler in the composition of Table B (column C) is increased a putty will result which can be used to fill holes, or as a putty for glazing in windows.

While two preferred embodiments of latex modified mortars are described in detail hereinabove, a workable, improved modified latex mortar or concrete is achieved by providing a mixture in which the latex forms at least 40% of the combined weight of latex, filler, and cement, making the latex the primary binder. The increased latex allows replacement of 25%–90% of the cement material with additional fine fillers while maintaining the improved composition.

In its broader aspects the proposed mortar composition and/or patching composition of the present invention combines the following ingredients in the indicated ranges:

| Ingredients | Range (Parts by Weight) |
| --- | --- |
| Sand | 0–400 |
| Cement | 25–75 |
| Fine Filler | 75–25 |
| Latex | 40–65 |
| Water | 25–0 |
| Additives* | 0–2 |

*Additives include Antifoam agent, surfactants, retarders, etc.

While preferred embodiments have been described in detail hereinabove, it is apparent that various changes and modifications might be made without departing from the scope of the invention which is set forth in the accompanying claims.

What is claimed is:

1. A patching composition comprising:
   up to about 65 wt% sand having an average particle size substantially greater in diameter that 0.05 mm;
   about 16 to about 46 wt% inorganic fine fillers having an average particle size substantially less in diameter than 0.15 mm, wherein the combined weight of said sand and said inorganic fine fillers is greater than 50 wt% of the total weight of said patching composition;
   about 5 to about 15 wt% cement selected from the group consisting of hydraulic cements;
   about 14 to about 39 wt% latex binder selected from the group consisting of polyvinyl acetate, polystyrene, polyvinylchloride, polyacrylates, and copolymers thereof; and up to about 2 wt% additives, selected from the group consisting of anti-foaming agents, surfactants, and retarders.

2. The patching composition, according to claim 1, wherein said cement is a portland cement.

3. The patching composition, according to claim 1, wherein said latex binder contains about 50 wt. % solids and the balance is water.

* * * * *